Dec. 10, 1940.                    R. E. CROOKE                    2,224,182
                              RECORDING MECHANISM
                              Filed June 2, 1939
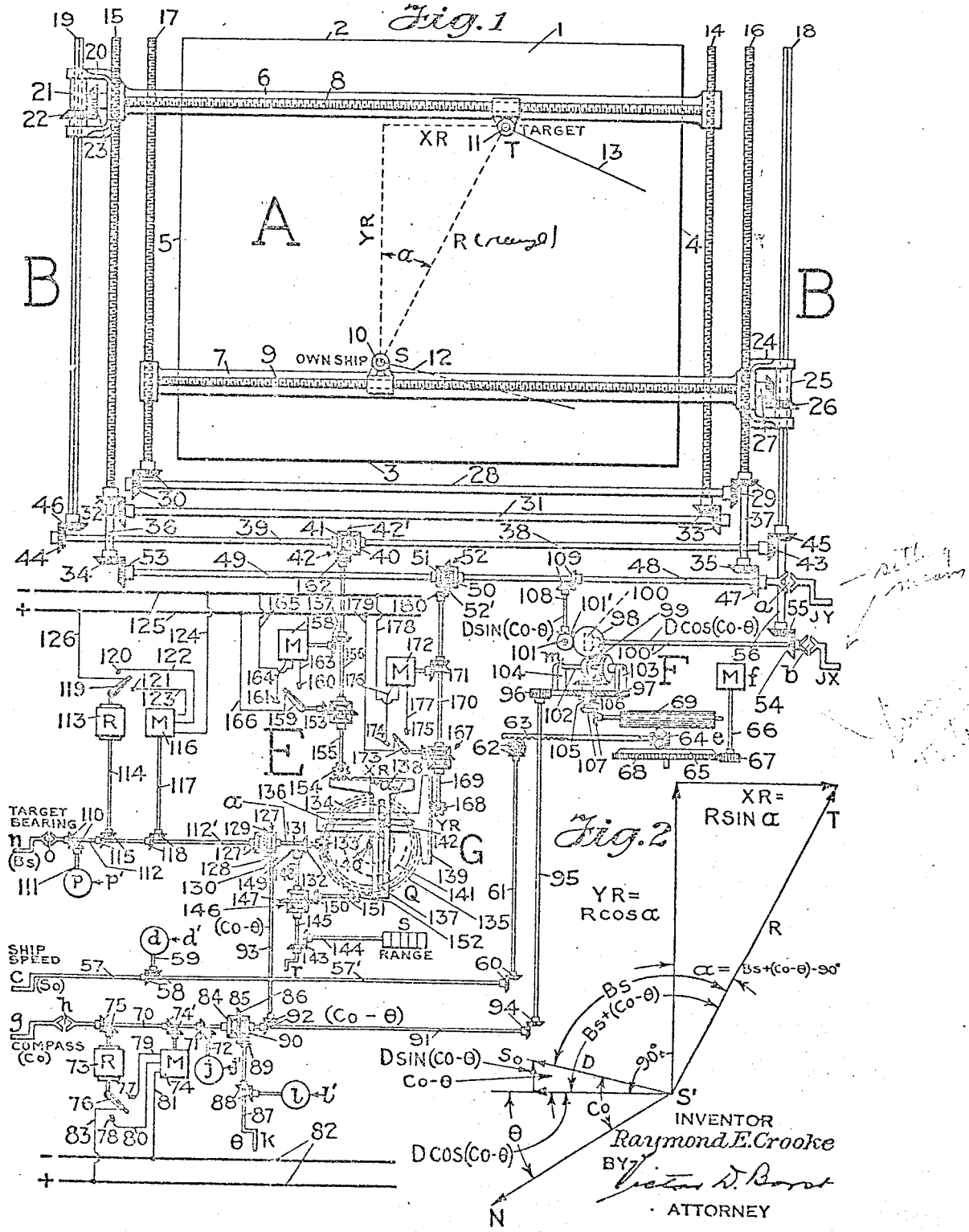
INVENTOR
Raymond E. Crooke
BY
ATTORNEY Patented Dec. 10, 1940

2,224,182

UNITED STATES PATENT OFFICE 2,224,182

RECORDING MECHANISM

Raymond E. Crooke, Great Neck, N. Y., assignor to Ford Instrument Company, Inc., Long Island City, N. Y., a corporation of New York Application June 2, 1939, Serial No. 276,959

7 Claims. (Cl. 234—26)

The invention herein disclosed relates to course tracers and more particularly to an instrument of this type having recorders which trace or graphically indicate the course of an object or ship on which the instrument is placed, and the course of another object or ship relative to that of the first object or ship, or the courses individually of either one of the objects or ships.

While the instrument is susceptible of various uses, on land, water and in the air, for recording the course of an object or ship, it is a device which is particularly useful in tracing the relative positions and headings of an observer's ship and a target ship and by means of which, for example, the commander of a war vessel may have before him a plan or tracing of the battle as it progresses, showing the relative positions and headings of the two ships at every instant.

These instruments, commonly referred to as battle tracers, have previously traced navigational positions of the observer ship and that of the target ship and all bearings and courses have been true or compass directions. This tracing is oftentimes confusing as it becomes necessary for the observer to orient himself with respect to the tracing sheet, before he can visualize the problem as it would be seen by an observer stationed on the bridge of the observing ship. Further, in view of the particular nature of certain problems, due to the extent and the relative direction of the ship's and target's true or compass courses, it often becomes impossible to confine the tracing of the problem to the sheet. There is still further the possibility of interference of the recording or tracing elements during the progress of the tracing.

It is an object of this invention to provide an improved instrument of this type by means of which an observer may have before him a plan or tracing, on a tracing surface, showing the relative positions and headings of two ships or objects at every instant, and arranged in such a manner on the tracing that the observed ship or object, irrespective of relative compass directions, is always represented as it is viewed from the observing ship or own ship, as it is generally known, that is, with own ship at the bottom of the tracing.

It is another object of the invention to provide in such an instrument means for orienting the direction of the tracing relative to the tracing surface of the instrument.

It is a further object of the invention to provide an instrument whereby interference between the recording or tracing elements during the progress of the tracing may be prevented.

It is a still further object of the invention to provide in such an instrument means for controlling the position of the tracing on the tracing surface along rectangular axes of the instrument.

It is a still further object of the invention to provide an instrument in which the indications or the tracing of the courses of the ships or objects are continuously generated.

In accordance with the invention these objects together with other objects and certain advantages, which will hereinafter appear, are accomplished by the use of an instrument including elements whereby movements are introduced which represent, for example, the compass course and speed of an observer's ship on which the instrument is placed, the bearing of the observed ship relative to the fore and aft line of own ship, and the range of the observed ship. Appropriate mechanism in the instrument operable in accordance with these movements generates movements representing components of the movements of both of these ships. Recorders are provided for tracing the actual and relative movements of the two ships on a tracing surface. One of these recorders is controlled in accordance with components of movement of the observer's ship, and the other recorder is controlled in accordance with components of position of the observed ship corresponding to the range and relative bearing of the observed ship from the observing ship. Means are provided for orienting the direction of the tracing relative to the tracing surface whereby the position of the observed ship will appear on the tracing surface in the same relative position as the observed ship would be seen by the observer, and for indicating the angle of the orientation.

The indications of the movements of both the observer's and observed ships are continuously generated, and the instrument may be used to trace the courses of either one individually, or of both relative to each other.

The following descritpion will be confined to use of the instrument as a battle tracer on board an observing ship for the purpose of making a tracing, not only of the movement of the ship on which it is installed, but that of a target ship. However, it should be distinctly understood that this is for convenience only, and is in no manner a limitation upon the scope of the invention which, as heretofore stated, may be used in other environments and for various purposes.

In the accompanying drawing:

Fig. 1 shows schematically an instrument embodying the invention; and

Fig. 2 is a diagram of the problem solved by the instrument.

The instrument includes generally a tracing surface A, a recording mechanism B, having a recorder S for tracing the movement of the ship, and a recorder T for tracing the movement of the target, and a mechanism E for operating the recording mechanism B.

The tracing surface A consists of a rectangular shaped board or plane 1, fixed relative to the ship on which it is installed, and adapted to receive tracings from the recorders S and T. The board 1 has parallel sides 2, 3 and 4, 5 which form respectively, horizontal and vertical boundaries thereof as viewed in the drawing, and define the directions of the rectangular axes of the instrument and the coordinates controlling the relative positions of the recorders S and T, indicated by the broken lines XR and YR. The broken line R represents the range of the target from the ship, and $\alpha$ represents the angle between YR and R, the determination of which will be described hereinafter. The coordinates XR and YR of Fig. 1 represent, respectively, the components XR and YR of Fig. 2, from which it appears that they are equal respectively to $R \sin \alpha$ and $R \cos \alpha$. This board may be mounted horizontally as, for example, on a table or vertically on a bulkhead of the ship.

The recording mechanism B comprises a pair of parallel feed bars 6 and 7 having rotatably mounted thereon feed screws 8 and 9 respectively. The recorders S and T are mounted on the feed screws 9 and 8 respectively, which they threadably engage for movement relative to each other and to the tracing surface. These recorders carry pencils or marking elements 10 and 11, for tracing the courses of the ship and the target on the surface of the board 1, as indicated at 12 and 13 respectively. A pair of rotatably mounted feed screws 14 and 15 are located one on each side of the board and parallel to the sides 4 and 5 thereof. Opposite ends of the bar 6 threadably engage the feed screws 14 and 15 for movement of the bar relative to the bar 7 and the tracing surface, in the direction of the vertical rectangular axis of the instrument. Another pair of rotatably mounted feed screws 16 and 17 are located, one on each side of the board 1, adjacent and parallel to the feed screws 14 and 15 respectively. Similarly, opposite ends of the bar 7 threadably engage the feed screws 16 and 17 for movement of the bar 7 relative to the bar 6 and the tracing surface. A pair of rotatably mounted feed shafts 18 and 19 are located, one on each side of the board 1, adjacent and parallel to the feed screws 16 and 17 respectively.

In order to accomplish rotatable movement of the feed screw 8, for the purpose of communicating movement of the recorder T, relative to the recorder S and to the tracing surface, a yoke 20 on one end of the bar 6 encloses a rotatable sleeve 21 which slidably engages with the shaft 19 and is splined thereto. In consequence thereof, the sleeve 21 has a rotatable and slidable relation with the shaft 19. This rotatable movement is communicated to the feed screw 8 by means of a bevel gear 22 mounted on the sleeve 21, and another bevel gear 23 secured to the end of the feed screw 8, and which gear meshes with the gear 22.

In an identical manner, rotatable movement of the feed shaft 18 is communicated to the feed screw 9 by means of a yoke 24 on the end of the bar 7, a sleeve 25, a bevel gear 26, and a bevel gear 27 secured to the end of the feed screw 9.

Movement of the feed screw 16 is communicated to the feed screw 17 by means of a cross shaft 28 and connecting bevel gears 29 and 30. Movement of the feed screw 15 is communicated to the feed screw 14 by means of a cross shaft 31 and connecting bevel gears 32 and 33. Movements are communicated to the feed screws 15 and 16 by means of bevel gears 34 and 35 which are mounted on the ends 36 and 37 respectively of these feed screws. Movement of the feed shaft 18 is communicated to the feed shaft 19 by means of cross shafts 38 and 39 respectively connected to opposite sides 40 and 41 of a differential 42, having a spider 42', and bevel gears 43 and 44 which mesh respectively with bevel spur gears 45 and 46 which are secured to the lower ends of these feed shafts.

In order to set or adjust the positions of the recorders S and T, relative to the tracing surface of the board 1, and in the directions of the rectangular axes respectively of the instrument, cranks JY and JX are provided.

The crank JY, for setting or adjusting the positions of the recorders S and T relative to the tracing surface, in the directions of the sides 4 and 5, is connected through a clutch $a$ and a bevel gear 47, to drive the gear 35, meshing therewith, and concomitantly the feed screw 16 and the feed screw 15. For this purpose, the movement of the crank JY is communicated to the feed screw 15, through the clutch $a$, the bevel gear 47, cross shafts 48 and 49, connected respectively to opposite sides 50 and 51 of a differential 52 having a spider 52', and a bevel gear 53 which meshes with the gear 34.

The crank JX, for setting or adjusting the positions of the recorders S and T relative to the tracing surface in the direction of the sides 2 and 3, is connected to drive the feed shaft 18 through a clutch $b$, and a gear 54 which meshes with a gear 55 secured to the extension 56 of the feed shaft 18.

From the foregoing description it will be apparent that, upon the application of movements to the operating shafts of the recording mechanism B, relative movements of the recorders S and T will be effected in accordance with these movements. Further, the pencils 10 and 11 of these recorders will trace a record of these movements on the tracing surface such as, for example, the lines 12 and 13 of Fig. 1.

The operating mechanism E comprises a mechanism F, controlled in accordance with the speed and course of the ship, and a mechanism G, controlled in accordance with the relative bearing and range of the target from the ship.

The mechanism F utilizes, as one of the elements in the determination of the movements applied to the recording mechanism B, for tracing the course of the ship, the ship's speed, referred to hereinafter as ($S_o$), which is represented by the setting of a crank $c$, and indicated on a dial $d$ having a relatively fixed index pointer $d'$, and to which dial it is connected by means of a shaft 57, bevel gears 58 and a stub shaft 59.

The crank $c$ may be operated manually, or automatically by being attached to the ship's speed indicating apparatus. This setting, representing the ship's speed, may be integrated with respect to a time ($t$), during which the ship has traveled, to obtain a distance (D) in the following manner: An extension of the shaft 57, 57' is connected, by means of bevel gears 60 to one end of a shaft 61, the other end of which is operatively connected by means of bevel gears 62 and a rack 63 to a ball carriage 64, of a variable speed drive mechanism $e$, of the well known two-ball integrator type. The mechanism $e$ has a rotatably mounted disc 65, and a roller 69. The disc 65 is driven at a constant speed by a motor $f$ connected to the disc by means of a shaft 66 and a pinion 67, which meshes with teeth 68 on the periphery of the disc. The speed of the roller 69 is governed in a well known manner by the position of the ball carriage and the accumulated rotations thereof represent the distance (D) traversed by the ship.

The other elements used in the determination of the movements applied to the recording mechanism B, for tracing the movement of the ship, comprise the compass course of the ship, and an arbitrary angle $\theta$, which will be referred to hereinafter as the angle of orientation.

The compass course of the ship, hereinafter referred to as ($C_o$), is represented by the setting of a crank $g$, which setting is communicated through a clutch $h$, to a shaft 70 and indicated on a dial $j$ having a relatively fixed index pointer $j'$. The dial $j$ is connected the the shaft 70 by bevel gears 71 and a stub shaft 72. The angle ($C_o$) may be manually set by the operation of the crank $g$, or automatically by means of a repeater motor 73, operated by the ship's compass. The repeater motor 73 controls a follow-up motor 74 connected to drive the shaft 70 through bevel gears 74', in accordance with the movements of the repeater motor 73. It will be understood that when the crank $g$ is operated manually, the motors 73 and 74 are to be considered inoperative.

The rotor of the repeater motor 73 is operated electrically from the ship's compass, and the stator is rotatably mounted and connected to the shaft 70 by means of the bevel gears 75. The shaft of the rotor is operatively associated with a movable contact arm 76, cooperating with contacts 77 and 78, for controlling the operation of the motor 74.

For the energization of the motor 74, opposite sides thereof are connected, by means of conductors 79 and 80 to the contacts 77 and 78 respectively, and a common 81 of the motor is connected to the negative side of a supply line 82. The positive side of the supply line is connected by means of a conductor 83 to the contact arm 76. The shaft 70 communicates the movement representing the angle ($C_o$), to one side 84 of a differential 85 and having a spider 86.

The angle $\theta$, or the angle of orientation, shown in Fig. 2, is an arbitrary angle through which the tracing of the course of the ship and the relative position of the target may be oriented relative to the tracing surface, that is, shifted from the true or compass directions. This angle is represented by the movement of a crank $k$, indicated on a dial $l$ having a relatively fixed index pointer $l'$, and to which dial it is connected by means of a shaft 87 and bevel gears 88. The setting of the crank $k$ is communicated to the spider 86 of the differential 85 by means of an extension of the shaft 87 and a bevel gear 89. The elements representing these movements are so connected and arranged that, on account of this connection, the output of the differential 85, or the movement of the side 90 thereof, will represent the algebraic difference between the angles ($C_o$) and the ankle $\theta$ respectively, or the angle ($C_o - \theta$). This movement, or the output of the differential 85, is communicated to a shaft 91, and this movement is also communicated to another shaft 93 by means of bevel gears 92. The outer end of the shaft 91 is connected, by means of bevel gears 94 to one end of a shaft 95, having a pinion 96 on the other end which meshes with teeth on the periphery of a rotatably mounted base 97 of a trigonometric integrating mechanism $m$.

The trigonometric integrator $m$, the construction and operation of which is well known, consists essentially of an integrator ball 98, an input or driving roller 99, and two output or driven rollers 100 and 101. The input roller 99 is mounted on a horizontal shaft 102 journaled in standards 103 and 104, carried by the rotatable base 97, having a central opening 105 through which extends a vertical shaft 106. The shaft 106 is connected by means of bevel gears 107 to the output roller 69 of the integrator or mechanism $e$. The shaft 106 thus communicates the movement (D) representing the distance traversed by the ship from the mechanism $e$ to the input roller 99 of the integrator or mechanism $m$.

The movement representing the angle ($C_o - \theta$) is communicated to the base 97 of the integrator $m$ as already described. The angular position of the base 97, and hence the axis of rotation of the input roller 99 determines the axis of rotation of the integrator ball 98. Consequently, the output rollers 101 and 100, in a well known manner, produce movements which represent the products of the distance (D) and the sine and cosine respectively of the angle ($C_o - \theta$). These products, shown in Fig. 2 [$D \sin(C_o - \theta)$] and [$D \cos(C_o - \theta)$], are are rectangular components of movement for controlling the movement of the ship's recorder S and the target's recorder T relative to the tracing surface of the recording mechanism B.

The output of the mechanism F, or the movements of the output rollers 101 and 100 of the mechanism $m$, is communicated to the recording mechanism B in the following manner:

The roller 101, the movement of which represents [$D \sin(C_o - \theta)$], is connected by means of bevel gears 101' to a shaft 108, which is connected by means of bevel gears 109 to the cross-shaft 48. One end of this cross-shaft is connected to one side of the recording mechanism B, by means of the bevel gear 47, which meshes with the bevel gear 35, on the shaft 37 of the recording mechanism; and the other end of this cross-shaft 48 is connected through the differential 52, another cross-shaft 49, the bevel gears 53 and 34, to the shaft 36 of the other side of the recording mechanism B. The roller 100, the movement of which represents [$D \cos(C_o - \theta)$], is connected to the recording mechanism B by means of the shaft 100' and the bevel gears 54 and 55. The bevel gear 55 drives the feed shaft 18 directly and feed shaft 19 through the bevel gears 45 and 43, the shaft 38, differential 42, the shaft 39 and bevel gears 44 and 46.

The mechanism G, controlled in accordance with the relative bearing and range of the target from the ship, utilizes, as one of the elements, in the determination of the movements to be applied to the recording mechanism B, the bearing of the target relative to the ship, referred to hereinafter as ($B_s$), and which is represented by the movement of a crank $n$. The movement of the crank $n$ is indicated on a dial $p$ having a relatively fixed index pointer $p'$ and to which crank it is connected, by means of a clutch $o$, bevel gears 110 and a stub shaft 111. This movement of the crank $n$ is also communicated through the clutch $o$ to a shaft 112.

The target bearing angle ($B_s$) may be manually set by the operation of the crank $n$, or automatically by means of a repeater motor 113. The repeater motor 113 may be operated by a target observing telescope, or by a suitable connection with the ship's range finder. The rotatably mounted stator of repeater motor 113 is operatively connected to the shaft 112 by means of a shaft 114 and bevel gears 115. This motor controls the movement of a follow-up motor 116 which is connected, by means of a shaft 117 and bevel gears 118, for driving an extension 112' of the shaft 112, and in accordance with the movements of the repeater motor 113. It will be understood that when the crank $n$ is operated manually, the motors 113 and 116 are to be considered inoperative.

The rotor of the repeater motor 113 is operated electrically from the ship's range finder, or target observing telescope, and the shaft of the rotor is operatively connected to a movable contact arm 119 cooperating with contacts 120 and 121 for controlling the operation of the follow-up motor 116.

For the energization of the motor 116, opposite sides thereof are connected, by means of conductors 122 and 123, to the contacts 120 and 121 respectively, and a common side 124 of the motor is connected with the negative side of a supply line 125. The positive side of the supply line 125 is connected by means of a conductor 126 to the contact arm 119.

The shaft 112', which is so adjusted relative to the dial P and the repeater motor 113 that its movement represents the angle ($B_s-90°$), is connected to one side 127' of a differential 127. The movement of the shaft 93, as already described, represents the angle ($C_o-\theta$). This movement is combined algebraically with that corresponding to the angle ($B_s-90°$), by connecting the shaft 93 to a spider 129 of the differential 127 by means of a bevel gear 128. The output of the differential 127, or the movement of the side 130 thereof, represents the angle $[B_s+(C_o-\theta)-90°]$ or the angle $\alpha$ as will be seen by reference to Fig. 2. The output side 130 of the differential 127, is connected to a component solving mechanism Q, by means of a shaft 131, and a pinion 133, which meshes with teeth on the periphery of a rotatably mounted disc 134 of the component solving mechanism Q.

The mechanism Q, the construction and operation of which is well known, consists essentially of a pair of cooperating, relatively movable, and rotatably mounted input discs 134 and 135, and a pair of cooperating, relatively movable output componently arranged slides 136 and 137 having racks 138 and 139 respectively. The discs 134 and 135 are mounted on the center 140. The disc 135 has a spiral groove 141 cut in the side adjacent to the disc 134 and cooperating with a pin 142 movable in a radial slot in the disc 134. It will be understood that movement of the disc 135 relative to the disc 134 will cause radial movement of the pin 142.

The other element, utilized in the mechanism G in the determination of the components of the position of the target, relative to the ship, along the said rectangular coordinates, is the range of the target from the ship, referred to, hereinafter, as R, and which is represented by the movement of a crank $r$. The range R is manually set by the operation of the crank $r$, and indicated on a range indicator or counter $s$, to which it is connected by means of bevel gears 143 and a shaft 144. The range R may also be set automatically, by means of a repeater motor controlling a follow-up motor, and connected to drive the bevel gears 143. This repeater motor may be actuated by a transmitter controlled by the range finder of the ship, in a manner similar to that already described, for introduction into the instrument of the movements representing the angles ($B_s$) and ($C_o$).

This movement of the crank $r$ is communicated through the bevel gears 143 and a shaft 145, to one side of a compensating differential 146 having a spider 147. The other side of this differential is connected to the shaft 131 by means of a shaft 148, and a bevel gear 149, which meshes with the gear 132. The spider 147 of this differential is operatively connected to the component solver Q, by means of a bevel gear 150, a shaft 151, and a pinion 152 which meshes with teeth on the periphery of the disc 135 of the component solver Q.

From the foregoing description it will be apparent that when rotatable movements representing the angle $\alpha$ and the range R are applied to the input discs 134 and 135 respectively, of the mechanism Q, that, in a well known manner, movements will be communicated to the output component slides 136 and 137 equal to (R cos $\alpha$) and (R sin $\alpha$) respectively. These are the components of the target's position, relative to that of the ship, along rectangular components, controlling the position of the target's recorder T relative to the ship's recorder S, along the rectangular axes of the instrument, and which are denoted by the broken lines XR and YR respectively in Fig. 1.

The outputs of the mechanism G, or the components of the target's position relative to the ship in the direction of these coordinating axes, are applied to the recording mechanism B in the following manner:

The outputs of the mechanism Q are represented by the movements of the racks 138 and 139, and which are respectively, the abscissa XR and the ordinate YR of the coordinates referred to hereinabove.

The movement of the rack 138 is communicated to one side of a differential 153, by means of a pinion 154, which meshes with teeth on the rack arm 138, and a shaft 155. The other side of this differential is connected by means of a shaft 156 and bevel gears 157 to a shaft of a follow-up motor 158. The follow-up motor 158 is controlled by a movable contact arm 159, operated by the spider of the differential 153, and which arm is cooperatively associated with relatively fixed contacts 160 and 161.

Energization of the follow-up motor 158 is effected, by means of conductors 163 and 164, connecting opposite sides of this motor with the contacts 160 and 161 respectively. The common side of this motor is connected by a conductor 165 to the negative side of the supply line 125, and the positive side of this line is connected to the contact arm 159 by means of a conductor 166.

An extension of the shaft 156 is connected to the differential 42, by means of a bevel gear 162 meshing with the spider 42' thereof. The movement, therefore, of the rack 138, which represents the XR component of the target's position relative to the ship, is applied to the feed shaft 19 of the recording mechanism B, through the differential 42, the cross-shaft 39, and the gears 44 and 46.

Similarly, the movement of the rack 139, which represents, as already described, the ordinate of the said coordinates, is communicated to one side of a differential 167, by means of a pinion 168, which meshes with teeth on the rack 139, and a shaft 169. The other side of the differential 167 is connected by means of a shaft 170 and bevel gears 171 to a shaft of a follow-up motor 172. The follow-up motor 172 is operable to drive the shaft 170 by means of the bevel gears 171, and is controlled by a movable contact arm 173, operated by the spider of the differential 167, and which arm is operatively associated with relatively fixed contacts 174 and 175.

Energization of the follow-up motor 172 is effected by means of conductors 176 and 177 connecting opposite sides of this motor with the contacts 174 and 175 respectively. The common side of this motor is connected by a conductor 178 to the negative side of the supply line 125, and the positive side of the line is connected to the contact arm 173 by means of a conductor 179.

An extension of the shaft 170 is connected to the differential 52, by means of a bevel gear 180, meshing with the spider 52' thereof. The movement, therefore, of the rack 139, which represents, as already pointed out, the component of the target's position relative to the ship in the direction of the ordinate of the said coordinates, is applied to the recording mechanism B, through the differential 52 and the cross-shaft 49.

It will be readily apparent that by varying the value of the angle $\theta$, the direction of the abscissa of the coordinating axes referred to may be selectively oriented about the center S' of the diagram, which orientation is accomplished in the instrument by means of the crank $k$.

For the purpose of placing the instrument embodying this invention, hereinabove described, in an operative condition, certain initial settings and adjustments in the instrument must be effected. The elements corresponding to the ship's course and speed and the relative bearing and range of the target are set into the instrument, as already described, either automatically or by means of their respective cranks. The adjustments relating to the proper initial positioning of the tracing elements, with respect to the tracing surface, are effected as follows: Assuming, for example, that the recorders S and T are in the approximate relative positions as indicated in Fig. 1, and that the directions of their respective courses (toward the left side of the sheet) are the same as those of the lines 12 and 13 of this figure; the crank $k$ is operated to orient the target recorder T relative to the ship's recorder S, that is, to angularly shift the position thereof, relative to that of the ship's recorder S, through an angle $\theta$, referred to hereinabove as the angle of orientation; the crank $k$ is operated until the recorder T is moved to a position relative to the recorder S so that a line joining these recorders will be approximately parallel to the side 4 of the board 1; the crank JX is now turned in the proper direction, imparting equal simultaneous movements of translation to the recorders S and T along the feed screws 9 and 8 respectively, and toward the side 4 until these recorders are adjacent thereto. The instrument is now in operative condition, and the directions of the relative courses of the ship and target as represented by the recorders have been modified, that is, the directions of the courses have been oriented relative to the tracing surface, through the angle $\theta$ and indicated on the dial $l$.

From the foregoing description it will be evident that the operating mechanism E of the instrument embodying this invention operates through mechanisms G and F and controls the continuous operation of the recording mechanism B.

It will be apparent that the mechanism G may be operated as a unit separate from that of the mechanism F, to move the recorder T of the recording mechanism B relative to a fixed point S and therefore constitutes a single tracer of the target's position relative to the own ship or sighting station.

Similarly, it will be apparent that the mechanism F may be operated as a unit separate from that of the mechanism G, to move the recorder S of the recording mechanism B, and therefore constitutes a single course tracer of the ship.

It will also be apparent that the directions of the tracings of the relative courses of the ship and target, producible by the mechanisms F or G individually or jointly, may be indicated in accordance with the true or compass courses, by making $\theta$ zero, or the tracing may be selectively oriented relative to the tracing surface by changing the setting $\theta$. By this means a tracing of the course may be obtained in which the target occupies the conventional position relative to the ship, and interference between the recorders or tracing elements may be prevented, that is, the target feed bar is always above or beyond the own ship feed bar. The instrument's dials continuously indicate the course and speed of the ship, the range and the relative bearing of the target from the ship, and the angle $\theta$, through which the tracing has been oriented relative to the tracing surface, so that the courses indicated on the tracing surface may be reduced to the true or compass directions by applying the angle $\theta$ thereto. Appropriate mechanism is provided, as already described, for adjusting the initial relative positions of the tracing elements and their positions relative to the tracing surface.

The instrument may also be used by a shore station or battery to trace the course of a ship or target, and in the same manner may be used by a ship to trace its own course relative to the position of a shore station or battery.

Further, the instrument may be used in a similar manner, by an airship to trace its course on a chart or map of the locality over which it is traveling, relative to a station on the ground, and in the case of "blind flying," the instrument can be adapted to cooperate with the direction of radio beams, by substituting these directions for the target bearing angle $B_s$.

It is obvious that various changes may be made by those skilled in the art in the details of the embodiment of the invention illustrated in the accompanying drawing and described above within the principle and scope of the invention as expressed in the appended claims.

I claim:

1. A ship's course tracer comprising a tracing surface, two rectangular coordinates related to said surface, a recorder movable along said coordinates, a component solver operable to resolve the ship's movement into rectangular components, means for setting the component solver according to the ship's compass course, separate means for modifying the said compass course setting, and means for moving the recorder according to the ship's components of movement.

2. A ship's course tracer comprising a tracing surface, two rectangular coordinates related to said surface, a recorder movable along said coordinates, a component solver operable to resolve the ship's movement into rectangular components, means including a differential for directionally setting the component solver, one means for introducing into the differential the ship's compass course, another means for introducing a selected constant angle setting into the differential, and means for moving the recorder according to the ship's components of movement.

3. A ship's course tracer comprising a tracing surface, two rectangular coordinates related to said surface, two recorders movable along said coordinates, one representative of the ship and the other of a target, a component solver operable to resolve the ship's movement into rectangular components, means for setting the component solver according to the ship's compass course, separate means for modifying the said compass course setting, and means for moving both recorders according to the ship's components of movement.

4. A ship's course tracer comprising a tracing surface, two rectangular coordinates related to said surface, a recorder movable along said coordinates, a component solver including a mechanical vector settable according to the bearing and range of a target and operable to resolve the vector into rectangular components, means to set the vector according to the true bearing of the target, separate means for introducing a modifying angle into said compass course setting, and means actuated by the component solver to move the recorder along the coordinates proportionally to the rectangular components.

5. A ship's course tracer comprising a tracing surface, two rectangular coordinates related to said surface and including two parallel bars overlying the surface and movable toward and from each other, a recorder carried by each bar, one representing the ship and the other a target, a ship's component solver operable to resolve the ship's movement into rectangular components, means for setting the ship's component solver according to the ship's compass course, means for actuating the ship's component solver at a speed proportional to the ship's speed; a target component solver including a mechanical vector settable according to the bearing and range of the target and operable to resolve the vector into rectangular components, means to set the vector according to the range, means to set the vector according to the true bearing of the target, separate means for independently altering the directional setting of the ship's component solver and of the vector respectively, means for moving both recorders proportionally to the components of ship's movement, and means for moving the target recorder proportionally to the components of the target vector.

6. Means for tracing the successive relative positions of two objects comprising a tracing surface having physical rectangular coordinates, two recorders disposed to move over the surface along said coordinates and adapted to trace thereon said positions, a component solver settable to the direction and speed of movement of one of the objects and operable to resolve the movement into rectangular components, actuating means operable to apply both components of movement to both recorders, a component solver including a mechanical vector settable according to the position of the other object relative to the one and operable to resolve said vector into rectangular components of position, actuating means operable to apply both components of position to one of the recorders, and separate means for angularly adjusting the coordinates of the two component solvers to orient the tracing as desired on the tracing surface.

7. A ship's course tracer comprising a tracing surface, two rectangular coordinates related to said surface, a recorder movable along said coordinates, a component solver operable to resolve the ship's movement into rectangular components, means for setting the component solver according to the ship's compass course, separate means for adding a selected constant angle to said compass course angle setting, and means for moving the recorder according to the ship's components of movement.

RAYMOND E. CROOKE.